UNITED STATES PATENT OFFICE.

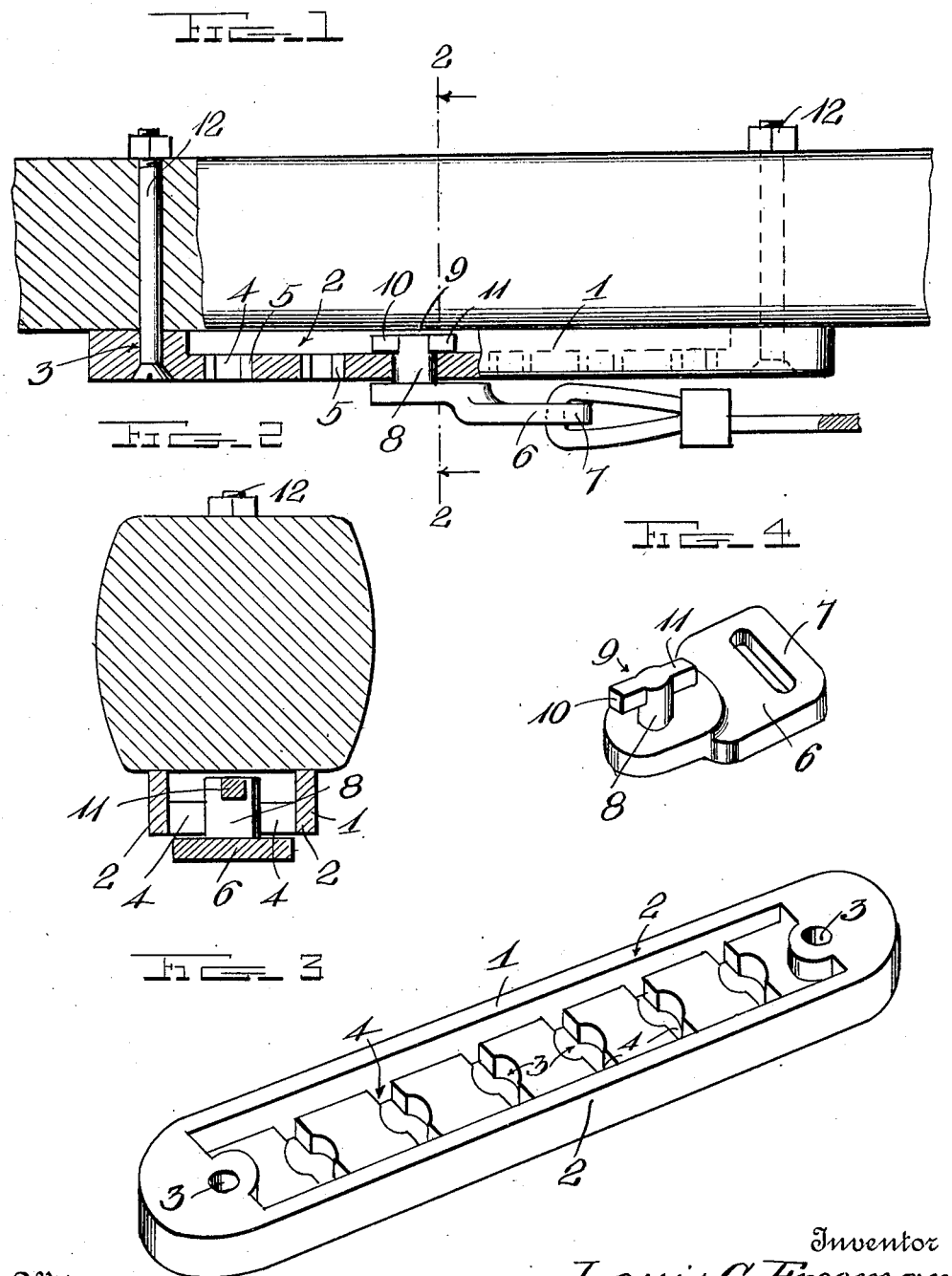

LOUIS C. FREEMAN, OF ELGIN, ILLINOIS.

BREECHING-STRAP FASTENER.

No. 920,315.  Specification of Letters Patent.  Patented May 4, 1909.

Application filed August 20, 1908. Serial No. 449,526.

*To all whom it may concern:*

Be it known that I, LOUIS C. FREEMAN, a citizen of the United States, residing at Elgin, in the county of Kane and State of Illinois, have invented certain new and useful Improvements in Breeching-Strap Fasteners; and I do declare the following to be a full, clear, and exact description of the invention, such as will enable others skilled in the art to which it appertains to make and use the same.

This invention relates to improved fastening devices for attaching the hold-back or breeching strap of a harness to the shaft of a buggy or other vehicle.

The object of the invention is to provide a simply constructed and efficient device of this character by the use of which the breeching straps may be quickly fastened and unfastened without any wrapping or buckling of the straps.

With these and other objects in view, the invention consists of certain novel features of construction, combination and arrangement of parts, as will be more fully described and particularly pointed out in the appended claim.

In the accompanying drawings, Figure 1 is a top plan view of a portion of a shaft with this improved device applied, Fig. 2 is a transverse section taken on line 2—2 of Fig. 1; Fig. 3 is a perspective view of the shaft carried member of the fastener detached; and Fig. 4 is a similar view of the strap carried member.

In the embodiment illustrated the shaft carried member is made in the form of an elongated plate 1, having a flange 2 extending laterally therearound. This plate 1 is provided at its opposite ends with bolt holes as 3, to receive bolts 12 for securing the plate to the upper or lower side of a shaft as may be desired. This plate may be made of any suitable metal, and is provided with a plurality of longitudinally spaced transversely extending slot-like apertures 4, preferably made in the form shown with an enlarged central portion 5, to receive the locking stud on the strap carried member now to be described. The strap carried member 6 is preferably made in the form of a small casting having a loop 7, extending transversely across one end thereof, and with its other end preferably reduced and off-set, and provided on its lower face with a laterally extending stud 8, provided with an oblong head 9 extending longitudinally of the member 6, and constructed to correspond in shape with the transversely arranged apertures formed in the shaft carried plate. As shown, this head 9 is made semi-cylindrical at the opposite sides of its middle portion with angular arms 10 and 11, extending laterally therefrom in the direction of the length of the casting 6.

In the use of this device the plate 1 is secured either to the top or the bottom of the shaft, as may be desired by means of bolts as 12, which extend through the bolt holes 3 at opposite ends of the plate 1, and are passed through the shaft and secured by nuts in the usual manner. The member 6 is connected with the breeching strap by passing the latter through the loop 7 and fastening it by buckling, or in any other desired manner. In fastening the breeching the head 9 of the member 6 is passed through one of the transversely extending slot-like apertures 4 in the plate 1 and is then given a one-quarter turn which brings the member 6 and the plate 1 into the same position in parallel planes with the arms 10 and 11, and the head 9 extending longitudinally of the plate 1 at right angles to the slot 4, with which it is engaged whereby the members are securely locked in operative position. When it is desired to disconnect the breeching it is necessary only to turn the casting 6 a one-quarter turn in either direction, which brings the head 9 in position to be disengaged from the plate 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

A breeching strap fastener comprising an oblong plate provided at opposite ends with bolt holes and with transversely extending longitudinally spaced rectangular slots having the central portions thereof enlarged on opposite sides, means for holding one face of said plate spaced from the shaft when attached, and a locking element having a loop at one end with its other end off-set and provided on one face with a laterally extending stud having arms extending laterally from opposite sides thereof and adapted to pass through said slots and be turned transversely thereof.

In testimony whereof I have hereunto set my hand in presence of two subscribing witnesses.

LOUIS C. FREEMAN.

Witnesses:
   CHARLES T. MCBRIARTY,
   SINCLAIR J. NOBLE.